United States Patent Office 3,413,267
Patented Nov. 26, 1968

3,413,267
COPOLYIMIDE-ISOIMIDE POLYMERS
John A. Kreuz, Williamsville, N.Y., assignor to E. I. du Pont de Nemours and Company, Wilmington, Del., a corporation of Delaware
No Drawing. Continuation-in-part of application Ser. No. 325,441, Nov. 21, 1963. This application May 17, 1966, Ser. No. 550,647
1 Claim. (Cl. 260—47)

This application is a continuation-in-part of my co-pending application Ser. No. 325,441, filed Nov. 21, 1963, allowed Mar. 2, 1966, and now U.S. Patent No. 3,271,366.

This invention is related to film-forming copolymers. More particularly, this invention is directed to the discovery of novel polyiminolactone/polyimide copolymers of 5–95 mole percent of the former and 95–5 mole percent of the latter, which copolymers have an unusual and outstanding combination of properties.

The novel copolymers of this invention are characterized by an excellent combination of properties, including hydrolytic stability, stiffness, toughness, shelf-stability, electrical properties, thermochromicity, convertibility to permanently creased or formed articles, flowability, etc. Furthermore, the novel copolymers are characterized by a glass transition temperature and melt and flow properties rendering the copolymer particularly useful in the adhesive field, among others.

The copolymers of this invention can be prepared in various ways, including those illustrated in the examples below. For example, they can be prepared by controlled thermal isomerization of polyisoimides, by catalytic isomerization of polyisoimides with agents such as triethylammonium acetate, and by treatment of polyamide-acids with converting agents such as thionyl chloride.

The polyamide-acids, polyisoimides and polyimides are known and their preparation is described for example in my above-mentioned parent patent. The polyamide-acids consist essentially of recurring units having the formula:

(1) 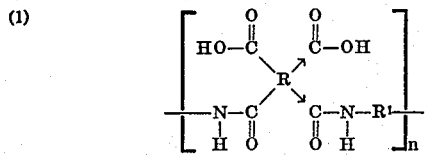

The polyiosimides consist essentially of recurring units having the formula:

(2) 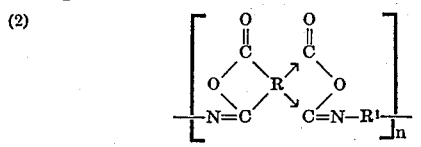

The polyimides consist essentially of recurring units having the formula:

(3) 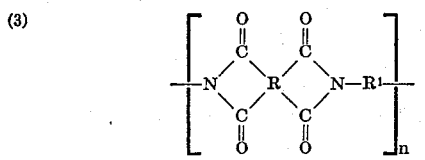

In the above formulas, the arrows denote isomerization; R is an aromatic tetravalent organic radical, preferably selected from the group consisting of

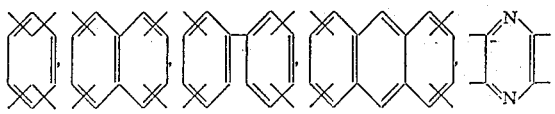

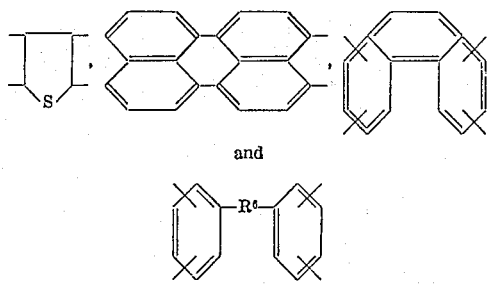

and

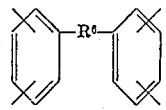

wherein $R^6$ is selected from the group consisting of an alkylene chain having 1–3 carbon atoms, carbonyl, —O—,

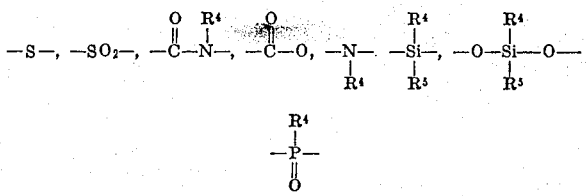

and

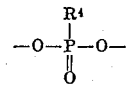

wherein $R^4$ and $R^5$ are selected from the group consisting of alkyl and aryl; $R^1$ is a divalent aromatic radical, preferably selected from the group consisting of phenylene, naphthylene, biphenylene, anthrylene, furylene, benzfurylene, and

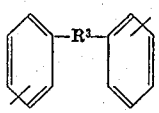

wherein $R^3$ is selected from the group consisting of an alkylene chain having 1–3 carbon atoms,

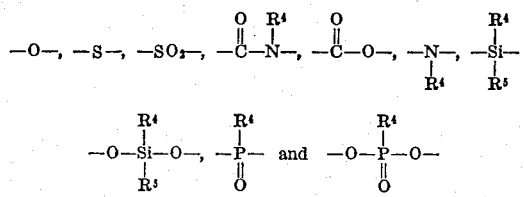

wherein $R^4$ and $R^5$ are selected from the group consisting of alkyl and aryl; and $n$ is an integer sufficient to provide an inherent viscosity of at least 0.1, and preferably 0.3–5.0, as measured at 30° C. at a concentration of 0.5% by weight of the polymer in a suitable solvent, e.g., N,N-dimethylacetamide, concentrated sulfuric acid, etc.

Representative R groups can be conveniently provided, as disclosed in my above-mentioned parent patent, by aromatic dianhydrides such as:

pyromellitic dianhydride;
2,3,6,7-naphthalene tetracarboxylic dianhydride;
3,3′,4,4′-diphenyl tetracarboxylic dianhydride;
1,2,5,6-naphthalene tetracarboxylic dianhydride;
2,2′,3,3′-diphenyl tetracarboxylic dianhydride;
2,2-bis(3,4-dicarboxyphenyl)propane dianhydride;
bis(3,4-dicarboxyphenyl)sulfone dianhydride;
3,4,9,10-perylene tetracarboxylic dianhydride;
bis(3,4-dicarboxyphenyl)ether dianhydride;
naphthalene-1,2,4,5-tetracarboxylic dianhydride;
naphthalene-1,4,5,8-tetracarboxylic dianhydride;
2,6-dichloronaphthalene-1,4,5,8-tetracarboxylic dianhydride;

2,7-dichloronaphthalene-1,4,5,8-tetracarboxylic dianhydride;
2,3,6,7-tetrachloronaphthalene-1,4,5,8- tetracarboxylic dianhydride;
phenanthrene-1,8,9,10-tetracarboxylic dianhydride;
2,2-bis(2,3-dicarboxyphenyl)propane dianhydride;
1,1-bis(2,3-dicarboxyphenyl)ethane dianhydride;
1,1-bis(3,4-dicarboxyphenyl)ethane dianhydride;
bis(2,3-dicarboxyphenyl)methane dianhydride;
bis(3,4-dicarboxyphenyl)methane dianhydride;
bis(3,4-dicarboxyphenyl)sulfone dianhydride;
benzene-1,2,3,4-tetracarboxylic dianhydride;
3,4,3',4'-benzophenone tetracarboxylic dianhydride;
2,3,2',3'-benzophenone tetracarboxylic dianhydride;
2,3,3',4'-benzophenone tetracarboxylic dianhydride;
pyrazine-2,3,5,6-tetracarboxylic dianhydride;
thiophene-2,3,4,5-tetracarboxylic dianhydride; etc.

Representative $R^1$ groups can be conveniently provided, as disclosed in my above-mentioned parent patent, by aromatic diamines such as:

meta-phenylene diamine;
para-phenylene diamine;
2,2-bis(4-amino-phenyl)propane;
4,4'-diamino-diphenyl methane;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
bis-(4-amino-phenyl)diethyl silane;
bis-(4-amino-phenyl)diphenyl silane;
benzindine;
3,3'-dichloro-benzidine;
3,3'-dimethoxy benzidine;
bis-(4-amino-phenyl)ethyl phosphine oxide;
bis(4-amino-phenyl)phenyl phosphine oxide;
bis(4-amino-phenyl)N-butylamine;
bis(4-amino-phenyl)-N-methylamine;
1,5-diamino-naphthalene;
3,3'-dimethyl-4,4'-diaminobiphenyl;
N-(3-amino-phenyl)-4-aminobenzamide;
4-aminophenyl-3-aminobenzoate;
and mixtures thereof.

The invention will be illustrated by the following examples.

EXAMPLE 1

Films of the polyisoimide based on pyromellitic dianhydride and 4,4'-diaminodiphenyl ether were prepared by casting a polyamide-acid solution (prepared in accordance with Edwards U.S. Patent No. 3,179,614) with a 2-mil doctor knife onto a polyethylene sheet, drying for 3 minutes at 98° C. in a forced draft oven, stripping the polyamide-acid films from the polyethylene sheets, placing them in a 1 molar solution of trifluoroacetic anhydride in benzene for 80 minutes, washing further in benzene, and drying overnight under nitrogen under reduced pressure. Analysis of the infrared spectra of these films, in comparison with the spectra of model imides and isoimides, indicated them to be 94% isoimide and 6% imide. The film samples were then clamped into individual frames and places in a forced draft oven at 350° C. for various periods of time, after which they were again examined by infrared analysis. The results are given in the following table.

| Heating time | Percent isoimide | Percent imide |
| --- | --- | --- |
| 25 min | 16 | 77 |
| 90 min | 12 | 89 |
| 22 hr | 3 | 96.5 |

The percentages are thought to be accurate within about ±5%.

EXAMPLE 2

Example 1 was repeated except that 1-mil films were cast with a doctor knife, and the resulting films were thermally isomerized from isoimide to imide at 300° C. In this case, the initial film was substantially all isoimide. The results of thermal isomerization are given in the following table, where the analyses are again thought to be accurate to within about ±5%.

| Heating time | Percent isoimide | Percent imide |
| --- | --- | --- |
| 2 hrs | 49 | 55 |
| 3 hrs | 36 | 63.5 |
| 4 hrs | 17 | 81 |
| 12 hrs | 13 | 88.5 |

EXAMPLE 3

Films of the polyamide-acid derived from pyromellitic dianhydride and 4,4'-diaminodiphenyl ether, 0.1 to 0.2 mil thick, were prepared in accordance with Edwards U.S. Patent No. 3,179,614. They were then suspended in a one molar solution of thionyl chloride in benzene at room temperature for 24 hours, washed in benzene, and dried at room temperature under nitrogen at about 15 mm. The infrared spectrum indicated these films to be about 54% isoimide and 46% imide. Their physical strength, 9,000 p.s.i.; and inherent viscosity, 0.26, as measured on a 0.1% solution in fuming nitric acid at room temperature.

EXAMPLE 4

To 15.1 grams of a 15% solids solution in N,N-dimethylaceamide of the polyamide-acid based on pyromellitic dianhydride and cumenediamine (2.3 grams of polymer) (prepared in accordance with Edwards U.S. Patent No. 3,179,614) was added over 15 minutes 2.78 grams of dicyclohexylcarbodiimide dissolved in 10 ml. of N,N-dimethylacetamide, and the mixture was stirred for 1 hour; it was then cooled, centrifuged to remove the N,N'-dicyclohexylurea by-product, filtered, and cast into films with 2-mil doctor knife. The films were dried at room temperature under nitrogen at reduced pressure to give polyisoimide films about 0.2 mil thick. The resulting films, which were substantially all isoimide, were immersed in a one molar solution of triethylammonium acetate in benzene at room temperature for 15 minutes, washed in benzene and dried. Infrared analysis of the resulting films indicated them to be 85% imide and 15% isoimide.

EXAMPLE 5

Acetyl chloride (1 ml.) is added at room temperature to 10 grams of a 10% by weight solution of the polyamide-acid of pyromellitic dianhydride and 4,4'-diaminodiphenyl ether in N,N-dimethylacetamide. After standing 26 hours the solution is cast into a thin film, which is dried at 50° C. and examined by infrared. The polymer contains about 10% isoimide, 20% normal imide and 70% polyamide-acid.

EXAMPLES 6–9

The procedure of Example 5 is repeated, using instead of acetyl chloride each of the following cyclizing agents, at 1 molar concentration in a benezene solution also containing pyridine in equimolar concentration:

Ex.
6.—propionyl fluoride
7.—valeryl chloride
8.—bromoacetyl bromide
9.—thionyl chloride The iminolactone content, as measured by infrared spectra, of each product is 60–70 mole percent, the remainder being primarily normal imide.

EXAMPLE 10

A deep orange polyiminolactone film is prepared by casting a polyamide-acid film of pyromellitic dianhydride and 4,4'-diamino-diphenyl ether onto a glass plate; drying 1.5 minutes at 100° C.; immersing in a 1 molar trifluoroacetic anhydride solution in benzene for 1 hour at room temperature; washing in benzene; and then drying under vacuum.

Samples of the polyiminolactone film are converted to polyiminolactone/polyimide copolymers of compositions varying from 5-95 mole percent by immersing the samples in a N,N'-dimethylformamide solution of 0.1 molar triethylammonium acetate. By removing the films from solution at various times and leaching out the triethylammonium acetate with fresh solvent, the isomerization is inhibited. Measurement of normal-imide absorbance at 13.85 microns relative to absorbance at 10.85 microns shows the extent of isomerization.

The invention claimed is:

1. A linear polymer consisting essentially of 5-95 mole percent of recurring units of the formula

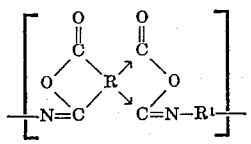

and 95-5 mole percent of recurring units of the formula

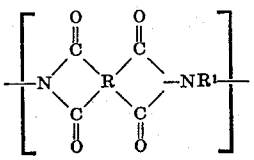

where the arrows denote isomerization;
R is an aromatic tetravalent organic radical, preferably selected from the group consisting of

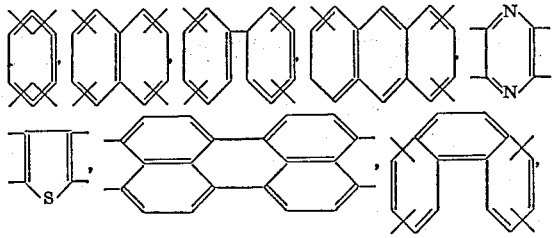

and

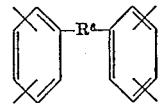

wherein $R^6$ is selected from the group consisting of an alkylene chain having 1-3 carbon atoms, carbonyl, —O—,

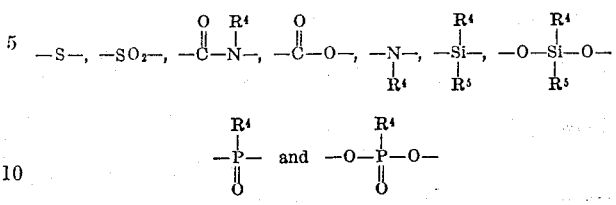

wherein $R^4$ and $R^5$ are selected from the group consisting of alkyl and aryl;
$R^1$ is a divalent aromatic radical, preferably selected from the group consisting of phenylene, naphthylene, biphenylene, anthrylene, furylene, benzfurylene, and

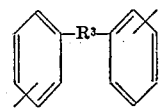

wherein $R^3$ is selected from the group consisting of an alkylene chain having 1-3 carbon atoms,

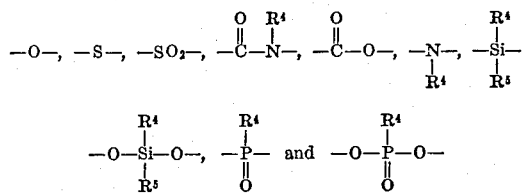

wherein $R^4$ and $R^5$ are selected from the group consisting of alkyl and aryl;
said polymer having an inherent viscosity of at least 0.1 as measured at 30° C. at a concentration of 0.5% by weight of the polymer in concentrated sulfuric acid.

References Cited
UNITED STATES PATENTS

| | | |
|---|---|---|
| 3,179,630 | 4/1965 | Endrey. |
| 3,179,631 | 4/1965 | Endrey. |
| 3,179,632 | 4/1965 | Hendrix. |
| 3,179,633 | 4/1965 | Endrey. |
| 3,179,634 | 4/1965 | Edwards. |
| 3,271,366 | 9/1966 | Kreez. |

WILLIAM H. SHORT, *Primary Examiner.*

H. D. ANDERSON, *Assistant Examiner.*